Jan. 13, 1925.  1,522,772

E. C. FEARNOW ET AL

FISHWAY

Filed April 17, 1924  8 Sheets-Sheet 4

Inventors

Edgar C. Fearnow
Glen C. Leach

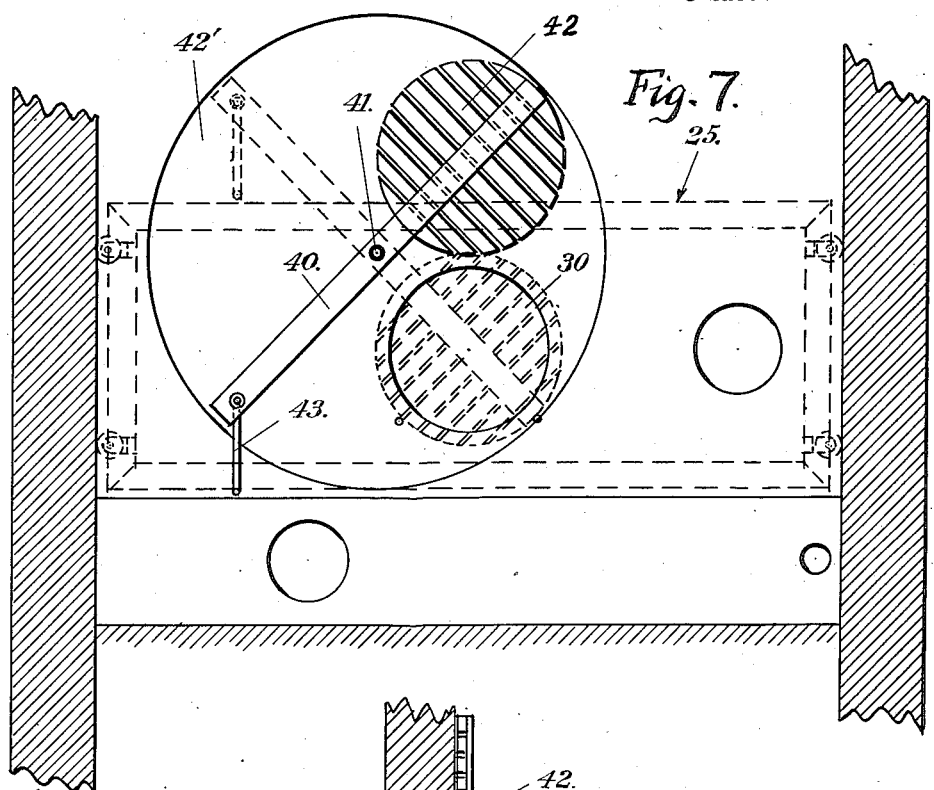
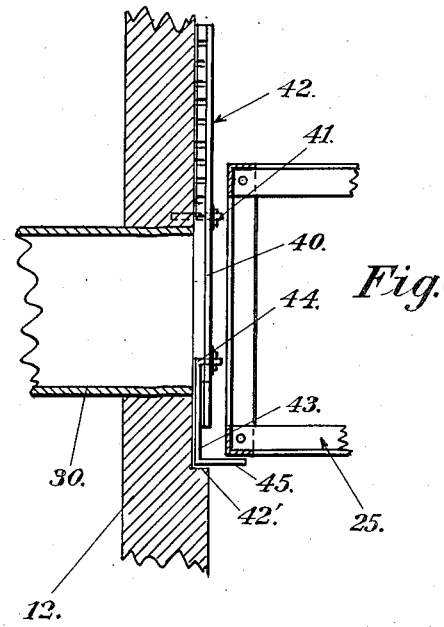

Patented Jan. 13, 1925.

1,522,772

UNITED STATES PATENT OFFICE.

EDGAR C. FEARNOW, OF CAPITOL HEIGHTS, MARYLAND, AND GLEN C. LEACH, OF WASHINGTON, DISTRICT OF COLUMBIA.

FISHWAY.

Application filed April 17, 1924. Serial No. 707,087.

*To all whom it may concern:*

Be it known that we, EDGAR C. FEARNOW, a citizen of the United States, residing at Capitol Heights, Prince Georges County, State of Maryland, and GLEN C. LEACH, a citizen of the United States, residing at Washington, District of Columbia, have invented certain new and useful Improvements in Fishways, of which the following is a specification.

This invention relates to improvements in fishways.

The present invention is particularly adapted for enabling fish to proceed up rivers or streams having dams of relatively great height. A dam of considerable height is substantially a stoppage against fish passing up-stream. The streams or rivers on the western coast of the United States have a great many dams whereby to collect waters for power and irrigation purposes, and as well known, these streams represent the home waters of the fish known as salmon. Salmon are hatched in these streams, and after reaching a certain degree of maturity, leave the streams and enter the ocean. These salmon return to their native waters after a period of time and are then fully matured and large in size. The salmon when returning proceed up the rivers as far as possible for the purpose of spawning and thus to provide eggs for renewing the supply of the young fish which in time migrate to the ocean, as before stated.

With that heretofore recited in view, it is the object of the present invention to provide a practicable means to enable salmon or other fish to pass over dams when proceeding up a river or stream and thus permit the salmon to return to their native waters for spawning.

It is an important object of the invention that the apparatus operate to transfer fish from the lower waters of a river, with relation to a dam, to the higher waters of said rivers without injury to the fish.

A still further object of the invention is that the apparatus be adapted to be operated by water pressure obtainable from the stream or river in which the same may be located.

A yet further object of the invention is that the apparatus may be incorporated in the structure of the dam at a relatively low cost.

It is also an object of the invention that the apparatus operate to transfer fish from the upper side of a dam to the lower side thereof and thus enable small fish to move down-stream.

It is also within the scope of objects of the invention that the apparatus as a whole operate in an automatic and reliable manner.

Other objects, and objects relating to details of construction, combination and arrangement of parts will hereinafter appear in the detailed description to follow.

The invention is illustrated by way of example in the accompanying drawings, in which—

Figure 7 is a fragmentary sectional elevation taken at a point adjacent the bottom of the transfer shaft or well included in the present invention and showing in particular the structure of a water gate employed;

Figure 8 is a fragmentary sectional view taken at right angles to Figure 7 and further illustrating the structure of the gate shown in Figure 7;

Figure 9 is a fragmentary view in side elevation showing a valve-operating means employed;

Figure 10 is a top plan view of the same, and,

Figures 11 and 12 are detailed views of a connecting or operating rod and cam member, respectively, employed in connection with the valve-operating means shown in Figures 9 and 10.

Like reference numerals refer to similar parts throughout the different views of the drawings.

Figure 3:
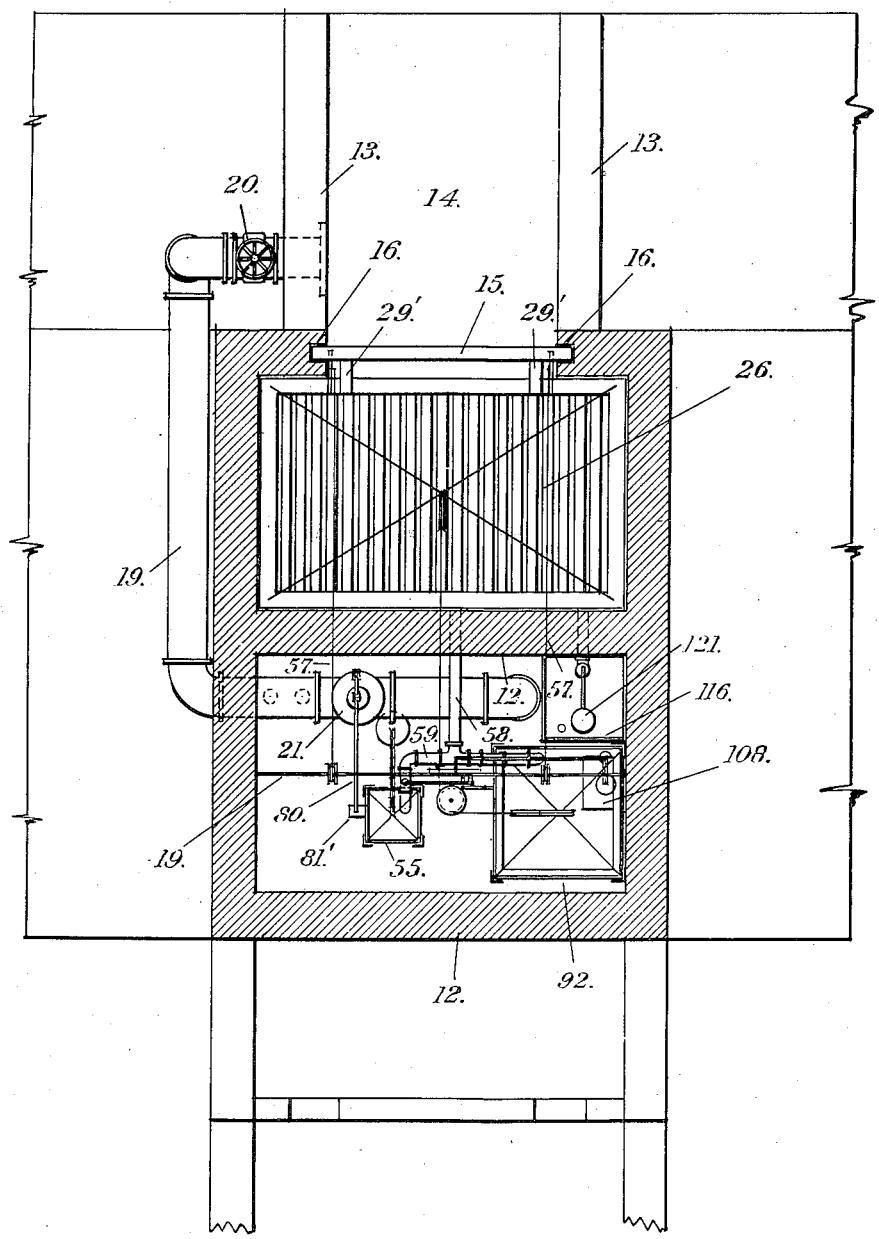
Figure 3 is a sectional plan view taken on line 3—3 of Figure 1.
Figure 4:
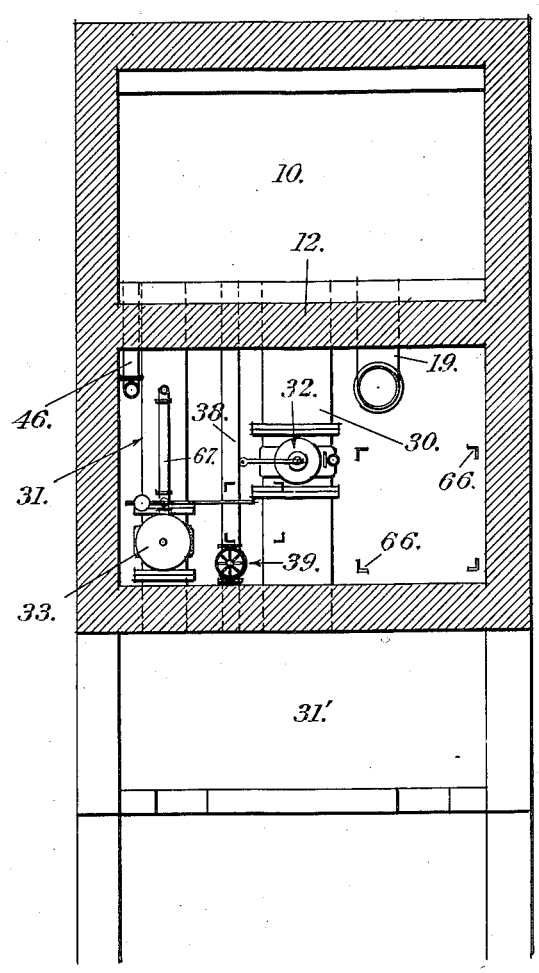
Figure 4 is a view similar to Figure 3 taken substantially on line 4—4 of Figure 1.
Figure 5:
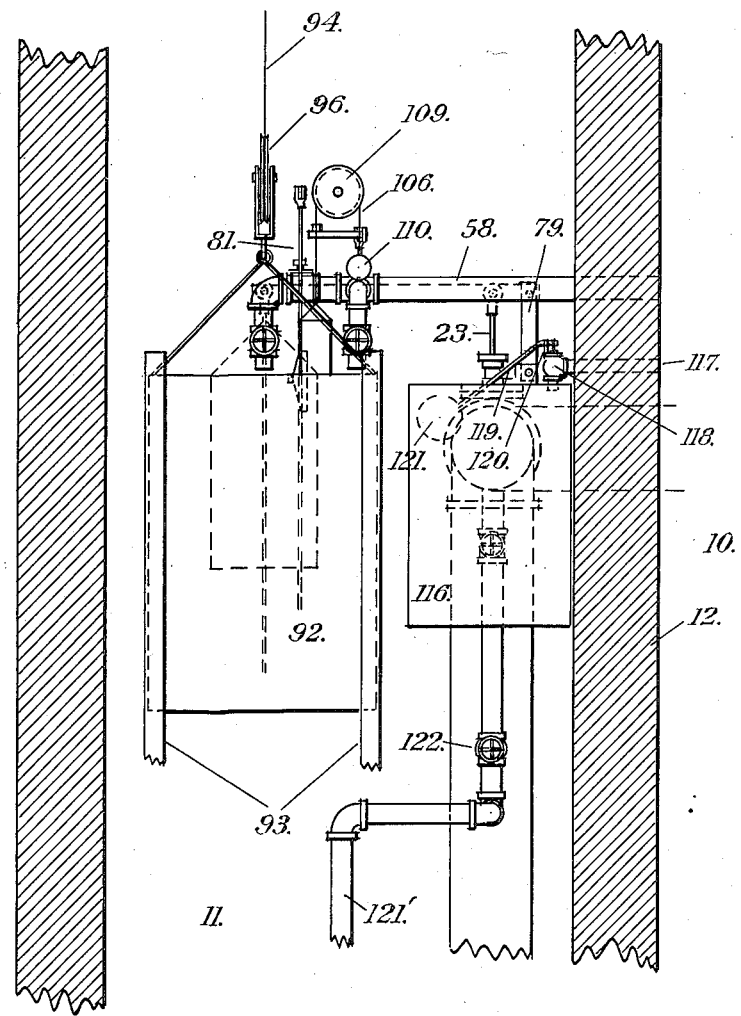
Figure 5 is an enlarged fragmentary view showing in side elevation a portion of the operating mechanism for the present apparatus.
Figure 13:
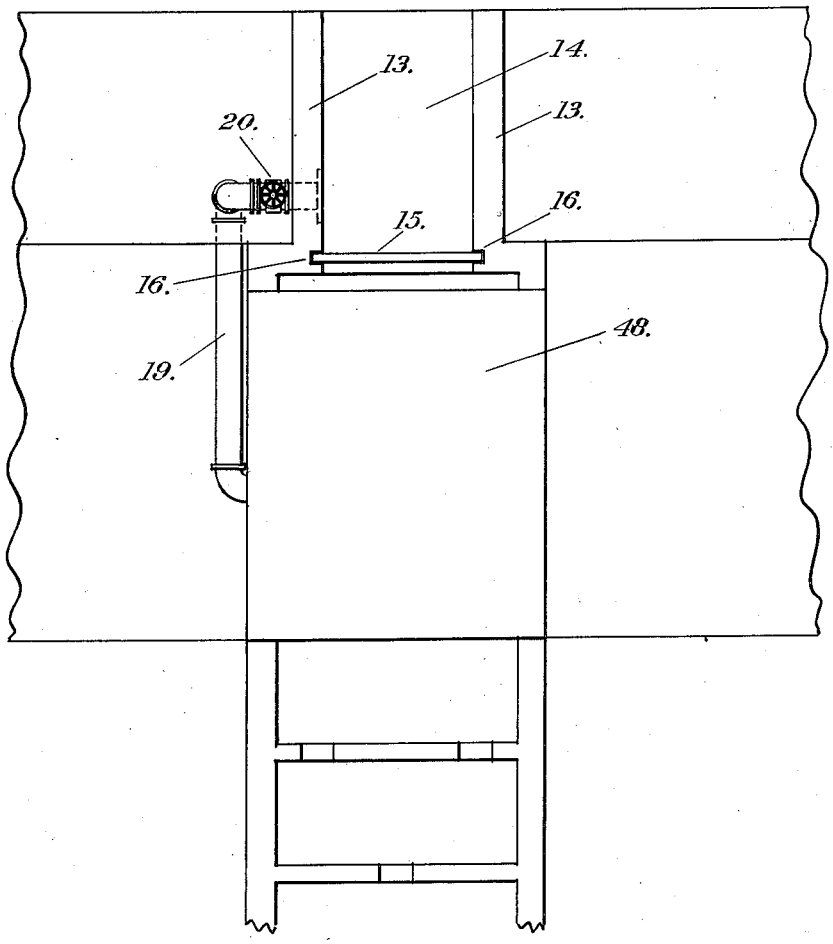
Figure 13 is a fragmentary top plan view of a dam construction with the present apparatus applied.

Preferably the dam structure with which the present invention may be associated is provided with shafts or wells 10 and 11 as best shown in Figures 3 and 13. These shafts are preferably aligned as shown, thereby providing a partition wall 12. The shaft 10 is of greater depth than shaft 11 as shown to advantage in Figure 1. The shafts 10 and 11 should be positioned near one end of the dam, preferably near the spillway, and suitable walls 13 may be extended from the upper wall of the dam thereby providing a sluiceway 14, which communicates at one end with the upper end of the shaft 10. The sluiceway 14 should be extended and so arranged that no great rush or current of water will flow therethrough when the same delivers water to the shaft 10. At the inner end of the sluiceway there is provided a gate 15 which may be in the form of a plate as shown, and slidable in grooves 16 formed in the walls 13. A pivoted latch member 17 is provided for each end of the gate 15, each latch being normally held in position for sustaining the gate 15 in its raised position, by a spring 18.

Means are provided whereby water may be taken from the sluiceway 14 and delivered directly to the bottom of the shaft or well 10. This means comprises a relatively large pipe 19, which communicates at its one end with the sluiceway 14 and at its other end with the bottom of the shaft or well 10 as shown. This pipe is preferably constructed in sections and is provided with two valves 20 and 21, the valve 20 being located adjacent the sluiceway 14 and provided with a hand wheel whereby the same may be manually operated. The valve 21 is located within the shaft 11. Between the sluiceway 14 and the associated end of the pipe there is positioned a grating 22 for the obvious purpose of preventing debris from entering the pipe 19.

Figure 2:
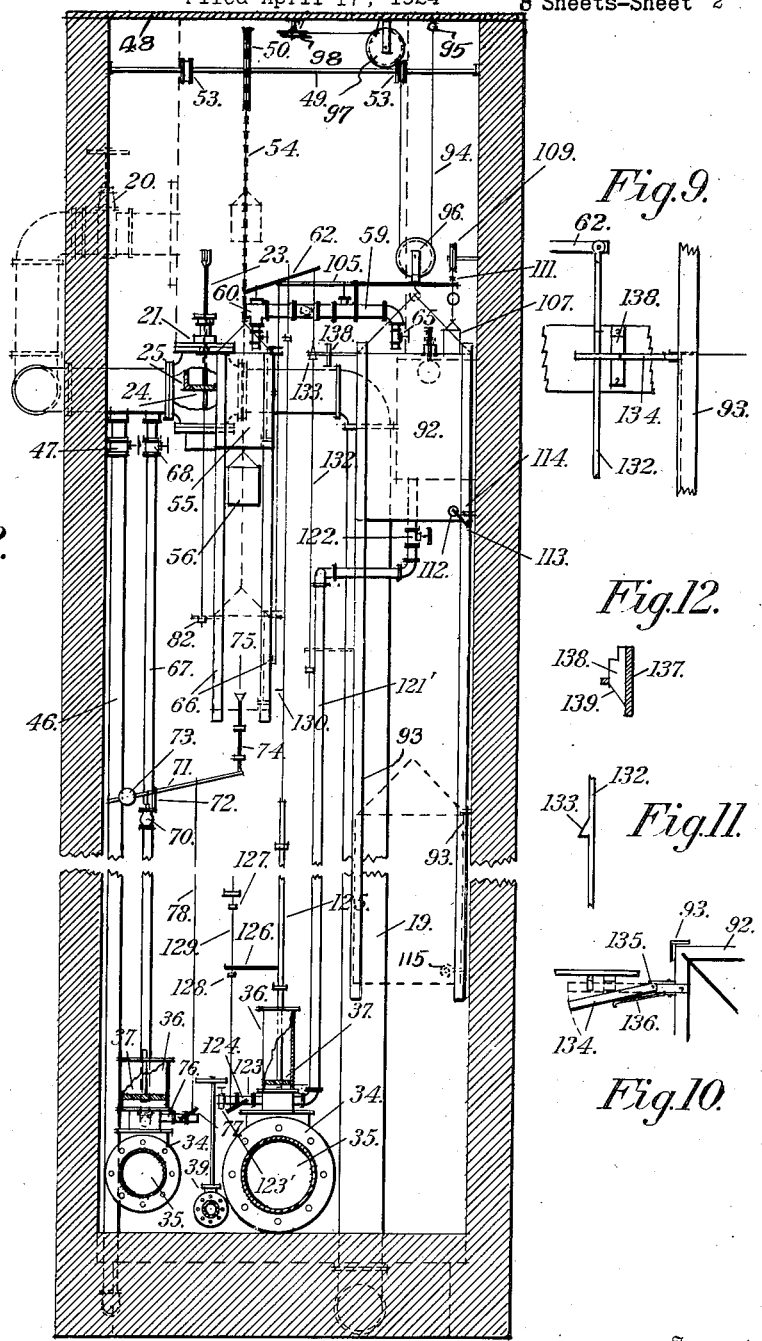
Figure 2 is a vertical sectional view taken substantially on line 2—2 of Figure 1 when looking in the direction of the arrows.

The valve 21 is preferably of the plunger type, and as shown in Figure 2, comprises the plunger or rod 23 carrying at its lower end a valve member 24 which is adapted to cooperate with an annular seat 25 to close the passage through the conduit 19.

The lower end of the shaft or well 10 has two of its opposing walls formed with an offset or ledge 23', thus to provide a basin or cavity 24 which is of less dimensions than the interior of the well 10. Also, the offsets 23' provide a seat for the frame generally indicated by the reference character 25. The frame 25 is vertically movable in the shaft 10 and is provided with a slatted bottom 26 (Figure 3). The frame is preferably equipped with rollers 27 to facilitate the movement thereof in the shaft 10. Also, the frame 25 carries a pair of upstanding rods 28 each terminating at its upper end in a laterally extending portion 29. The laterally extending portion 29 in each instance is adapted to engage with a lug 29' carried by the gate 15, and thereby lift said gate upon the frame 25 assuming an elevated position as illustrated by dotted lines in Figure 1.

Figure 1:
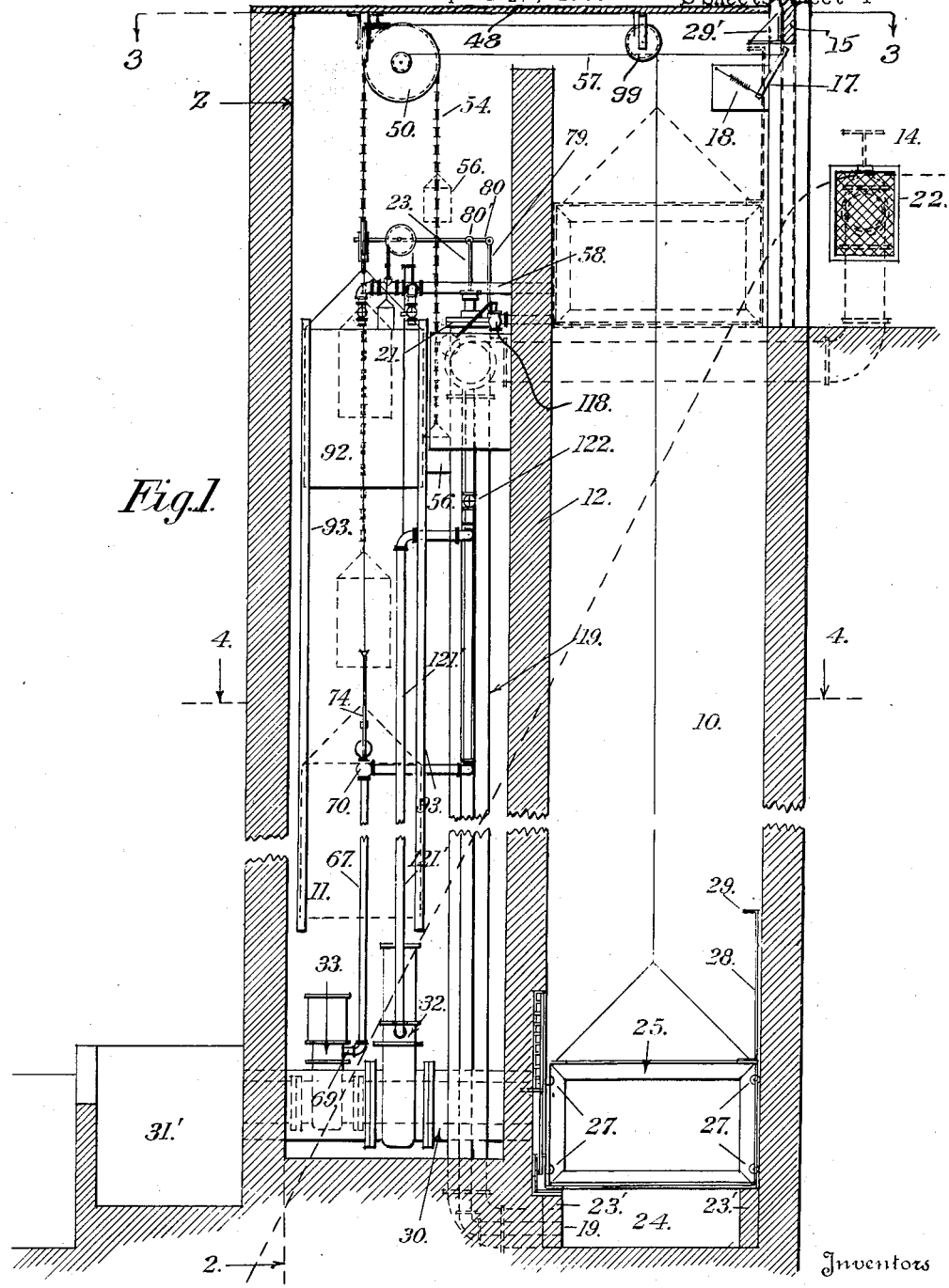
Figure 1 is a vertical transverse sectional view taken through the apparatus of the present invention when incorporated in a dam structure.

As shown to advantage in Figure 1, the outlet end of the water delivery pipe 19 communicates with the basin or cavity 24 in the bottom of the shaft 10. A pipe 30 extends from shaft 10 to jumping box 31' located forward to the lower side wall of the dam. Any number of jumping boxes may be provided and should be arranged in series upon the lower side of the dam as illustrated in Figure 1. It will be noted that the pipe 30 is disposed above the outlet of the water-delivery pipe 19. A second pipe 31 is provided which also establishes communication between the shaft or well 10 and the jumping box 31'. Each pipe 30 and 31 is provided with a hydraulic lift valve as shown at 32 and 33, respectively. Each valve 32 and 33 comprises a casing with the usual disc valve member 35 enclosed thereby. The valve casing carries a cylinder 36 which has movable therein a piston 37. It will be noted that the pipe 30 is of considerably greater diameter than the pipe 31 and the manner in which the hydraulic lift valves controlling these pipes are operated will later be described.

The lower end of the shaft or well 10 also communicates with the jumping box 31' through a relatively small pipe 38 which is provided with a hand-operated valve 39.

It may be here pointed out that the pipe or conduit 30 is of large diameter for the purpose of permitting fish to pass from the jumping box 31' into the shaft or well 10. The fish are permitted to enter the shaft or well 10 when the frame 25 is in its lowermost position as shown in Figure 1. The pipe 31 may be equipped with a grating which will prevent fish passing therethrough.

In order to exclude the fish from the shaft or well 10 when the frame 25 is raised there is provided a gate for the inner end of the pipe 30. This gate is best shown in Figures 7 and 8, and comprises a bar 40 which is pivotally supported by a pin 41 extending from the wall 12. The wall 12 is preferably provided with a circular depression 42', the diameter of which is slightly greater than the length of the bar 40. The bar 40 is disposed within this depression. The bar 40 carries at its one end a slatted closure 42 for the inner end of the pipe 30. The other end of the bar 40 carries an L-shaped member 43 which is formed at its one end with a lateral extension 44 to serve as a pivotal supporting means for said member as shown in Figure 8. Normally, the slatted closure 42 is in register with the inner end of pipe 30. The free end portion 45 of the member 43 is disposed in an obstructing position to the frame 25 and upon said frame approaching the bottom of the shaft or well the same will engage this portion and rotate the arm 40 to bring the slatted closure 42 into an inoperative position with relation to the pipe 30 as clearly shown in Figures 7 and 8.

The well or shaft 10 further communicates with the pipe 19 through an auxiliary water supply pipe 46 which is provided with a hand-operated valve 47. This pipe communicates with the lower end of the shaft as shown and its specific purpose will later be described.

At 48 there is indicated what may be termed a cover or top for the shafts or wells 10 and 11. This cover may be provided with one or more man-holes, not shown, to permit access to the interior of the shafts. Also the cover may be reinforced with beams, not shown, in order to properly support certain mechanism as will later appear. A shaft 49 extends between opposing walls of well 11 and carries a large sprocket wheel 50 and a pair of small drums 53. A sprocket chain 54 is trained about the sprocket wheel 50. This sprocket chain has secured to one end thereof a bucket generally designated by the reference character 55 and to its other end a counterweight 56. Each drum 53 has secured thereto the one end of a cable 57, the other end of each cable 57 being secured to the upper and free end of a latch 17 as best shown in Figures 1 and 3. A pipe 58 extends from the upper end of the wall 12 and communicates at its one end with the shaft or well 10. The other end of the pipe 58 communicates with a pipe 59, said pipe being disposed at right angles to the pipe 58. The pipe 59 carries at its one end a discharge valve 60 which is of the plunger type. This valve includes an operating stem. The casing of valve 60 carries an upwardly-extending arm 63 which is pivotally connected at its free end to the one end of a lever bar 62. The valve 60 carries a discharge nipple which in turn is provided with a hand-operated discharge valve 64. The remaining end of the pipe 59 is also provided with a hand-operated discharge valve 65 similar to the valve 64.

The bucket 55 is vertically movable within the guide members 66, said guide members being in the form of angle bars and supported by suitable brackets or the like not shown.

Referring again to the feed or delivery pipe 19 the same has connected thereto a pipe 67 which is provided with a valve 68 adjacent its end communicating with the pipe 19. The lower end of the pipe 67 communicates with the similar end of the cylinder 36 of hydraulic valve 33 as shown to advantage in Figure 2. The pipe 67 has interposed therein a second valve 70 which may be of the plunger type as that described for valve 21. The operating stem of the valve 70 is pivotally connected to a rod 71 which is fulcrumed by an upstanding member 72 carried by the pipe 67. One end of the rod or bar 71 carries a weight 73 and its other end is disposed to be engaged by the lower end of a rod 74, said rod 74 being suitably supported for vertical movement by guide members as shown. These guide members for the rod 74 may be supported by brackets (not shown) extending from the walls of the shaft 11. The upper end of the rod 74 is provided with an enlargement or head 75 which is in alignment with the bucket 55. The lower end of the cylinder 36 of valve 33 has a discharge nipple 76 which carries a stop cock adapted to be operated by a rocker arm 77 and this rocker arm 77 is operatively connected to the bar 71 by means of a link or rod 78.

The casing of the valve member 21 has extending upwardly therefrom an arm 79 which has pivotally connected to its free end one end of a rod 80. The valve stem 23 is pivotally connected to the rod 80 as shown at 80'. The remaining end of the rod 80 has depending therefrom a link 81, said link being pivotally connected at its upper end to the bar or rod 80 and longitudinally slidable through an opening in the arm 81' extending laterally from the bucket 55. The rod 81 carries the stops 82 and 83 which are adapted to serve for operating the valve 21 with the movements of the bucket 55 in a manner hereinafter to be described.

Figure 6:
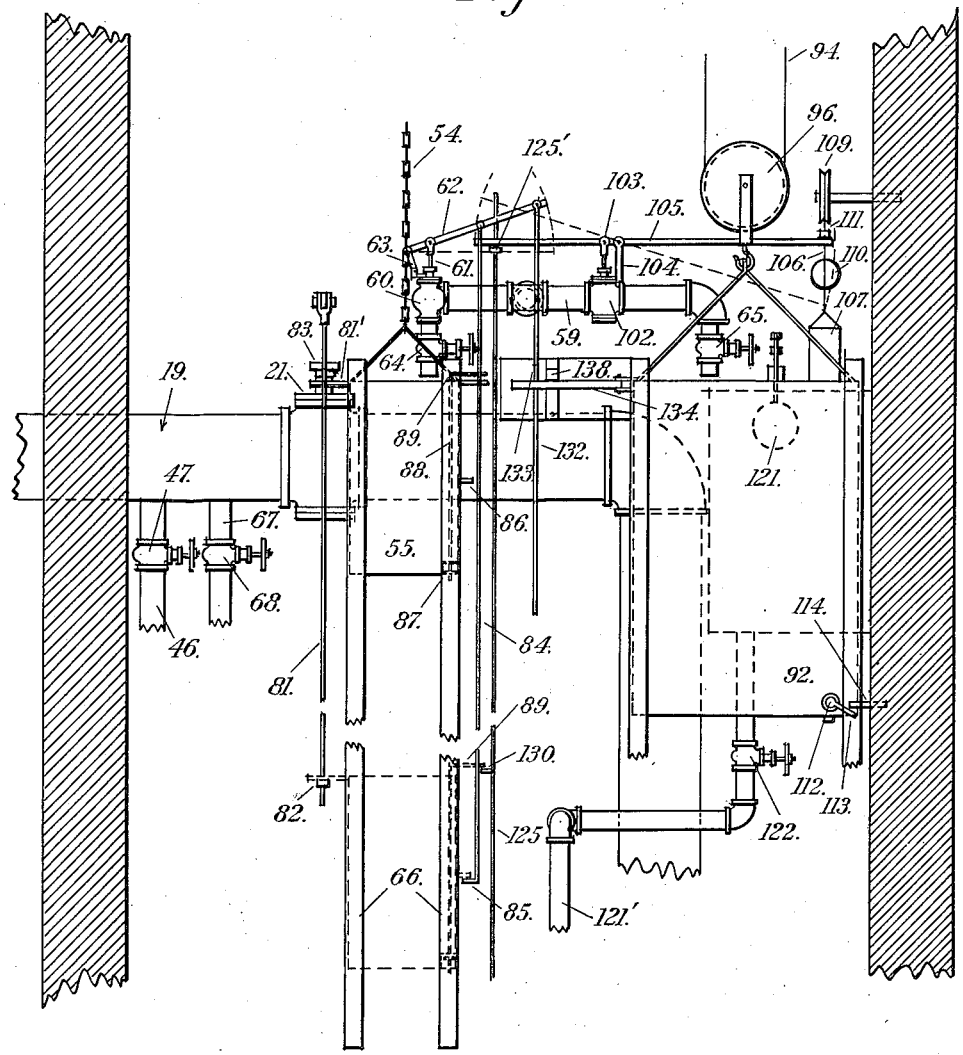
Figure 6 is a view similar to Figure 5, but showing the same mechanism in front elevation.

The lever bar 62 has depending therefrom a rod 80 which terminates at its lower end in an offset or laterally-extending portion 85 adapted to be engaged by a finger 86 extending from the bucket 55. The portion 85 of the rod 84 is so arranged that said rod 84 will be drawn downwardly immediately previous to the bucket 55 assuming its lowermost position as illustrated in dotted lines in Figure 6 and thus close the valve 60 at this particular moment.

The bucket 55 further carries a valve 87 adapted to close an opening in the bottom of said bucket. The valve is carried by a rod 88, said rod terminating at its upper end in an outwardly extending portion 89. Valve 87 normally remains closed by virtue of weight of rod 88.

A second bucket 92 is provided which is vertically movable in guides 93 and in register with the valve 65 of pipe 59. The guides 93 are preferably angle irons as shown, and brackets may be extended from the walls of the shaft 10 for supporting these guide members. The bucket 92 is considerably larger than the bucket 55. The bucket 92 is supported by a cable 94 which has its one end secured to the cover 48 as indicated at 95, and its other end secured to the frame 25 as shown in Figure 1. The cable 94 is trained through a sheave 96 which is connected to the bucket 92 and also trained through the sheaves 97, 98 and 99, thereby operatively connecting the bucket to the frame 25.

The pipe 59 also carries valve 102, which is of the plunger type, and its operating stem 103 pivotally connected to a lever bar 105, said lever bar being fulcrumed by an arm 104 carried by the casing of valve 102. The one end of the bar 105 is provided with an opening through which there passes a cable 106 said cable having secured to its one end a weight 107 normally adapted to rest upon a platform 108 located in the upper end of the bucket 92. The cable 106 passes over a pulley 109 and has secured to its other end a weight 110 which is smaller than the weight 107. The cable 106 has further secured thereto a stop 111 which is adapted to limit the movement of the cable in one direction through the opening in the bar 105.

The bottom of the bucket 92 is provided with a stop cock 112 which may be operated by a crank arm 113. Upon the bucket 92 assuming its elevated position as shown in full lines in Figure 6, a finger 114 is adapted to engage the crank 113 and close the valve 112. A second finger 115 is adapted to open the valve 112 upon the bucket 92 assuming its lowermost position, as illustrated in dotted lines in Figure 2.

A tank 116 is provided and preferably positioned in the shaft or well 11 at the place shown in the drawings. A pipe 117 extends through the wall 12 and communicates with the shaft 10 at its one end while its other end is provided with a valve 118 which is also of the plunger type. The valve 118 has its operating stem connected to one end of a rod 119, said rod 119 being fulcrumed by an arm 120 extending upwardly from the casing of valve 118. The free end of the rod 119 carries a float 121.

The bottom of the tank 116 has extending therefrom a pipe 121′ which has interposed therein a hand-operated valve 122. The pipe 121′ communicates at its lower end with the similar end of piston 36 for valve 32. The cylinder 36 is provided with a discharge pipe or nipple 123 which carries a control valve adapted to be operated by a rocker arm 124. The piston 37 of cylinder 36 has secured thereto a rod 125 which is extended upwardly a considerable distance as shown to advantage in Figure 2. This rod carries an arm 126 which is adapted to engage lugs 127 and 128 carried by a rod 129. The rod 129 is vertically movable and has its lower end connected to the rocker arm 124 of discharge valve for nipple 123.

The rods 125 and 129 may be supported for vertical movement in any desirable manner as by guides carried upon the brackets extending from the walls of the shaft 11. The upper end of the rod 125 passes through the bar 105 and carries a stop 125′ which is disposed beneath the bar 105. The rod 125 also carries a laterally extending finger 130 which is disposed in the path of travel of extension 89 on the valve carrying rod 88.

The lever bar 62 has also depending therefrom a rod 132 said rod being suitably held for vertical movement by guide brackets (not shown) and carrying a dog 133 which is adapted to be engaged by finger 134 carried by the bucket 92. The finger 134 is pivotally supported at its inner end as at 135 (Figure 10) and said finger is pressed inwardly by a spring 136. A supporting board 137 is provided and suitably mounted at the place shown in Figure 6 said board carrying a block 138 which is provided with a lower inclined surface 139. The block 138 is disposed in the path of travel of arm 134, as best illustrated in Figure 9 and upon the arm 134 engaging with the block 138 said arm will be pressed outwardly for releasing the dog 133 carried by the rod 132.

It is believed from the description heretofore given that a clear understanding may be had of the structure and assembly of the apparatus constituting the present invention. The operation of the apparatus as a whole will follow:

Let it be assumed that the buckets 55 and 92 are in their elevated position, as illustrated in full lines in the drawings, the valve 21 open, and the gate 15 also open; then the operation of the apparatus may be started by swinging upward the free end of the lever bar 62. With the valve 21 open and gate 15 open, the shaft 10 will be quickly filled with water. Upon opening the valve 60 water will flow through pipe 58 and into bucket 55. The time necessary to fill the bucket 55 may be regulated by the valve 64. Upon the bucket 55 being filled with water the same will move downwardly between its guides 66 and carry upwardly the counterweight 56. When the bucket 55 reaches its dotted-line position illustrated in Figures 2 and 6, the finger 86 carried thereby will engage with the projection 85 of the rod 84 and close the valve 60. It should be noted that the water continues to run into the bucket 55 during its downward movement, viz, the valve 60 is not closed until the bucket has substantially completed its downward movement, which insures that the bucket 55 will move downwardly in a certain and positive manner. Also, upon the bucket 55 reaching its dotted line position, its arm 81′ will engage the stop 82 of rod 81 and draw the lever bar 80 downwardly, thereby closing the valve 21. During this downward movement of the bucket 55 the shaft 49 is rotated and the cables 57 wound about the drums 53 thereby drawing the free ends of the latches 17 from beneath the gate 15 and permitting gate 15 to move downwardly and assume a position for closing the entrance of the sluiceway 15 into the well 10. The supply of water to the well 10 is now eliminated with the exception of the water flowing through the pipe 46. This pipe is always open. Also, the pipe 38 is maintained open in order that a constant stream of water may flow into the jumping box 31'. The water flowing from the jumping box 31' will attract the fish—that is, the fish will seek the source of this water and enter this jumping box.

The bucket 55 upon assuming its lowermost position depresses the rod 74 and lifts the weight 73 carried by the rod 71. This movement of the rod 71 opens the valve 70 and permits water to pass from pipe 19 into the cylinder 36 of the hydraulic lift valve 33. The water enters the bottom of cylinder 36 of this valve and the area of the piston head 37 is of such relation to the disc 35 that with the well 10 substantially filled with water, the water pressure from pipe 19 will be sufficient to lift the disc 35. The water will pass from the well 10 through the pipe 31 into the jumping box 31' and further attract the fish to enter the jumping box. As before stated, the pipe 31 is preferably provided with a grating to prevent fish entering the well 10 through this pipe.

After the water in the shaft or well 10 has reached a certain level—that is, after this water has been lowered a certain degree by the discharge from the pipe 31, the pressure in tank 116 will be sufficient to raise the disc 35 of the valve 32. Upon this occurring the piston rod 125 will move upwardly and its arm 126 engage the stop 127 carried by the rod 129 and open the discharge nipple 123. Also, the upward movement of the rod 125 brings its finger 130 into engagement with the projection 89 of the rod 88, thereby raising the valve 87 in the bottom of the bucket 55. During this movement of rod 125 the stop 125' carried by said rod 125 operates the lever bar 105 to open the valve 102.

The pipe 30 is now open and fish can pass through the same into the bottom of the well 10. The time the pipe 30 is maintained open depends upon the time necessary for the water to flow from the tank 116. This period can be regulated by the rate of discharge through nipple 123. Sufficient time should be allowed to permit all fish accumulated in the jumping box 31' to enter the bottom of the shaft 10. During this period the water in the well has reached its lowest level and no appreciable water pressure exists against the fish when entering said well.

As before stated, the valve in the bottom of the bucket 55 is lifted at the time the valve 32 is opened. The water in bucket 55 discharges through the opening in the bottom thereof provided by the valve 87 and upon the bucket 55 becoming empty the same moves upwardly—that is, the bucket is drawn upwardly by the counterweight 56. Upward movement of the bucket 55 permits the rod 71 to return to its original position and thus close the valve 70 and this is followed by the closing of the valve 33. The discharge from the tank 116 may be so regulated that during the upward movement of the bucket 55 the valve 32 will close—that is, the disc 35 of this valve will, by its own weight, move to its closed position. Previous to the bucket 55 reaching its uppermost position the arm 81' carried thereby engages the stop 83 of the rod 81 and lifts the free end of the lever bar 80, thereby opening valve 21. Water now proceeds from the sluiceway 14 through the pipe 19 and into the bottom of the well 10.

Upon the water in the well 10 reaching the level of the pipe 58, water will pass through said pipe and into the bucket 92. The bucket 92 will be filled with water in a short interval of time and will move downwardly carrying the frame 25 upwardly in the shaft 10. The upward movement of the frame 25 will cause fish in the shaft 10 to move upwardly. During the upward movement of the frame 25 the projections 29 of rods 28 will engage lugs 29' of gate 15 and elevate said gate. The fish are now free to proceed through the sluiceway 14 and into the upper waters of the river.

Upon the bucket 92 assuming its lowermost position, as shown in dotted lines in Figure 2, its outlet valve 112 will be opened by the finger 115. The bucket 92 will maintain this lowered position a sufficient interval of time to permit the fish to leave the shaft 10. When the bucket 92 is empty the weight of the frame 25 will carry this bucket upwardly. It should also be here pointed out that during the interval the frame 25 is elevated in the shaft 10, the slatted closure 42 will assume a position for closing the inner end of the pipe 30 and thus prevent fish coming into the well 10. Upon the frame 25 moving downwardly, previous to the moment the same becomes seated in the bottom of the shaft 10, the portion 45 of member 43 will be engaged by the frame and the slatted closure 42 swung to its inoperative position with relation to the pipe 30.

During the upward movement of the bucket 92 its arm 134 engages the dog 133 thereby lifting the free end of the lever bar 62 and opening valve 60. The arm 134 is swung from the engagement with the cam 133 by the block 138 immediately upon the lever bar 62 being swung upwardly a sufficient degree to open the valve 60. Also, at this period the finger 114 operates to close the discharge valve in the bottom of the bucket 92. Water will now flow from the shaft 10 into the bucket 55 and the operation heretofore described will be repeated.

It should be here pointed out that the float 121 operates to close the valve 118 when the tank 116 is filled with water from the supply pipe 117. It has been heretofore stated that the small fish may be transferred from the upper side of the dam to the lower side thereof by the present apparatus. This is entirely apparent from the fact that small fish may enter the shaft during the period water is discharged therein from the sluiceway 14 and leave said shaft through the pipe 30 while valve 32 is open. The apparatus heretofore described controls the flow of water to such a degree that small fish being transferred down stream would not be injured.

While we have shown and described the preferred form of our invention, it is to be understood that we are aware of the fact that the general structure, combination and arrangement of parts might be changed by those skilled in the art without departing from the spirit of our invention, as indicated by the appended claims.

What we claim is:

1. A water dam structure of the character described having a well, means for alternately filling the well with water and substantially reducing the height of the same and means for permitting fish to enter said well when the amount of water therein is thus reduced.

2. A water dam having a well, means for alternately filling the well with water and reducing said water to a low level in the same, and means for inducing fish to enter said well when water is at a low level.

3. A water dam having a well, means for alternately filling the well with water and reducing said water to a low level, means adapted to permit fish to enter the bottom of the well when said water is at a low level, and means whereby said fish may pass from the well when said well is filled with water.

4. A water dam having a well, means for alternately filling the well with water and reducing said water to a low level, means adapted to permit fish to enter the well when said water is at a low level, means adapted to cause the fish to move upward within the well when said well is filled with water, and means adapted to provide an exit for said fish from said well during the period said well is filled with water.

5. A water dam structure having a well, a valve-controlled opening between the bottom of the well and water on the lower side of the dam, means for filling the well with water, means adapted to operate the valve-controlling the opening in the bottom of the well whereby the water in said well may be reduced to a low level, means whereby fish may be permitted to enter the well during the period the water is at a low level, and means whereby said fish may pass from the well during the period the same is filled with water.

6. A water dam structure having a well, means for alternately filling the well with water and then reducing the same to a low level, means whereby fish may be permitted to pass into said well during the low level period of the water, and an exit at the upper end of said well adapted to permit the fish to leave the well when the same is filled with water.

7. A water dam structure having a well, means for alternately filling the well with water and then reducing the same to a low level, means whereby fish may be permitted to pass into said well during the low level period of the water, an exit at the upper end of said well adapted to permit the fish to leave the well when the same is filled with water, and means adapted to urge the fish upwardly and toward the exit of said well during this last named period.

8. A water dam structure having a well, means for alternately filling the well with water and then reducing the same to a low level, means whereby fish may be permitted to pass into said well during the low level period of the water, an exit at the upper end of said well adapted to permit the fish to leave the well when the same is filled with water, and means adapted to urge the fish upwardly and toward the exit of said well, during the last named period.

9. A water dam structure having a well, means for alternately filling the well with water and then reducing the same to a low level, means whereby fish may be permitted to pass into the said well during the low level period of the water, means adapted to permit the fish to leave the well when the same is filled with water, a rack vertically movable in the well, and means whereby the rack will be moved upwardly during the period the well is filled with water and thereby to urge the fish towards the exit of said well.

10. A water dam structure having a well, means for alternately filling the well with water and then reducing the same to a low level, means whereby fish may be permitted to pass into said well during the low level period of the water, an exit at the upper end of said well adapted to permit the fish to leave the well when the same is filled with water, a rack vertically movable in the well, and hydraulic operated means whereby the rack will be moved upwardly through the well during the period the same is filled with water and thereby to urge the fish toward the exit of said well.

11. A water dam structure having a well communicating at its bottom or lower end with the water on the lower side of the dam and communicating at its upper end with the water on the upper side of the dam, means for alternately filling the well with water and then reducing the same to a low level, and means for causing a constant flow of water from the well into the water on the lower side of the dam whereby to cause the fish to seek the source of said water and enter said well.

12. A water dam structure having a well communicating at its bottom or lower end with the water on the lower side of the dam and communicating at its upper end with the water on the upper side of the dam, means for alternately filling the well with water and then reducing the same to a low level, means for causing a constant flow of water from the well into the water on the lower side of the dam whereby to cause fish to seek the source of said water and enter said well, and means adapted to urge the fish to pass upwardly in the well during the interval the same is filled with water and thereby pass or move into the water on the upper side of said dam.

13. A water dam structure having a well therein, said well having an inlet communicating with the water on the upper side thereof and having an outlet adapted to discharge water from the lower side of the dam, means for closing the outlet and permit the well to fill with water, means for closing the inlet and permit gradual discharging of the water from said well, said means including the outlet for the well and said outlet being adapted to permit fish to pass therethrough into the bottom of the well, means for maintaining a certain depth of water in the well and a continuous discharge of water through the outlet of said well thereby enabling fish to enter the well during a low level period of the water, auxiliary means for again filling the well with water, and means for opening the inlet to said well after the same is filled the second time and permit the fish to pass from the well.

14. A water dam having a well therein, said well having an inlet communicating with the water on the upper side of the dam and an outlet adapted to discharge water from the lower side of the dam, means for closing the outlet and permitting the well to fill with water, means for closing the inlet and gradually discharging water from said well, said means including the outlet for the well and said outlet being adapted to permit fish to pass therethrough into the bottom of the well, means for maintaining a continuous discharge of water through the outlet during the low level period of the water thereby enabling fish to enter the bottom of said well, auxiliary means for introducing water into the bottom of the well, and again filling the same with the outlet valve thereof closed, and means for opening the inlet to permit the fish to escape from said well into the water on the upper side of said dam.

15. A water dam having a well therein, said well having an inlet communicating with the water on the upper side of the dam and an outlet adapted to discharge water from the lower side of the dam, means for closing the outlet and permitting the well to fill with water, means for closing the inlet and gradually discharging water from said well, said means including the outlet for the well and said outlet being adapted to permit fish to pass therethrough into the bottom of the well, means for maintaining a continuous discharge of water through the outlet during the low level period of the water thereby enabling fish to enter the bottom of said well, auxiliary means for introducing water into the bottom of the well and again filling the same with the outlet valve thereof closed, means for opening the inlet to permit the fish to escape from said well into the water on the upper side of said dam, and means adapted to urge the fish upwardly in said well during the interval the same is filled with water.

16. A water dam having a well therein, said well having an inlet communicating with the water on the upper side of the dam and an outlet adapted to discharge water from the lower side of the dam, means for closing the outlet and permitting the well to fill with water, means for closing the inlet and gradually discharging water from said well, said means including the outlet for the well and said outlet being adapted to permit fish to pass therethrough into the bottom of the well, means for maintaining a continuous discharge of water through the outlet during the low level empty period of the water thereby enabling fish to enter the bottom of the well, auxiliary means for introducing water into the bottom of said well and again filling the same with the outlet valve thereof closed, means for opening the inlet to permit the fish to escape from said well into the water on the upper side of said dam, a member vertically movable in the well, means for moving said member upwardly during the interval the well is filled with water, and means whereby upon said member completing its upward movement devices will be actuated for opening the outlet valve to said well after a predetermined interval of time and thereby to again start the operation heretofore described.

17. A water dam having a well, said well having an inlet at its top which communicates with the water on the upper side of the dam and an outlet adapted to discharge water from the lower side of said dam, a counter-balanced bucket, means whereby the bucket may be filled with water thereby causing the same to move downwardly, and means adapted to be operated by the descent of said bucket for closing the inlet to said well and opening the discharge or outlet thereof.

18. A water dam having a well, said well having an inlet at its top which communicates with the water at the upper side of the dam and an outlet adapted to discharge water from the lower side of the dam, a hydraulic lift valve for closing the outlet of said well, a counter-balanced bucket, means whereby water may be discharged into the bucket for filling the same to cause said bucket to descend, means whereby the descent of said bucket will cause water pressure to be delivered for operating the hydraulic lift valve and open the outlet to said well, and means adapted to be operated by the descent of bucket for closing the inlet to said well.

19. In an apparatus of the character described, a well having a pair of discharge valves, means whereby one of said valves may be opened for discharging water from said well, and means adapted to automatically operate for opening the other valve after the water in said well has been lowered a predetermined degree.

20. In an apparatus of the character described, a well having an inlet and an outlet, a counter-balanced bucket, means whereby the bucket may be filled with water to cause the same to descend, said outlet of the well being normally closed, means whereby with the descent of the bucket said outlet will be opened and the inlet closed, means whereby upon the bucket assuming its lowered position the water will be discharged therefrom, and means whereby upon the bucket assuming its initial position the inlet will be opened and the outlet closed.

21. In an apparatus of the character described, a well having an inlet and an outlet, a counter-balanced bucket, means whereby the bucket may be filled with water to cause the same to descend, said outlet of the well being normally closed, means whereby with the descent of the bucket said outlet will be opened and the inlet closed, means whereby upon the bucket assuming its lowered position the water will be discharged therefrom, means whereby upon the bucket assuming its initial position the inlet will be opened and the outlet closed, a rack within said well vertically movable, a second bucket counter-balanced by said rack, and means whereby after the discharge valve has been closed a predetermined interval the second bucket will be filled with water and thereby to elevate said rack in the well.

22. In an apparatus of the character described, a well having an inlet and an outlet, a counter-balanced bucket, means whereby the bucket may be filled with water to cause the same to descend, said outlet of the well being normally closed, means whereby with the descent of the bucket said outlet will be opened and the inlet closed, means whereby upon the bucket assuming its lowered position the water will be discharged therefrom, means whereby upon the bucket assuming its initial position the inlet will be opened and the outlet closed, a rack within said well vertically movable, a second bucket counter-balanced by said rack, means whereby after the discharge valve has been closed a predetermined interval the second bucket will be filled with water and thereby to elevate said rack in the well, means for causing the water in the second bucket to discharge therefrom when said bucket reaches a predetermined lowered level, and means whereby upon the second bucket assuming its initial position water will be caused to enter the first named bucket.

23. In an apparatus of the character described, a well having an outlet pipe at the bottom thereof, a device movable vertically in said well, and means adapted to be actuated upon said device assuming its lowermost position whereby said outlet will be provided with a reticulated or slatted closure.

24. In an apparatus of the character described, a well having an outlet, a rack member vertically movable in said well, a bar pivoted to the inner wall of said well and carrying a slatted closure adapted to normally arrange itself in registering relation with the outlet of said well, and means whereby with the rack assuming a lowered position said bar will be engaged for moving the slatted closure from its obstructing position with relation to said outlet.

EDGAR C. FEARNOW.
GLEN C. LEACH.